US008431061B2

(12) United States Patent
Stout et al.

(10) Patent No.: US 8,431,061 B2
(45) Date of Patent: Apr. 30, 2013

(54) METHOD FOR MANUFACTURING A CERAMIC COMPOSITE ARTICLE

(75) Inventors: Jeffrey B. Stout, Canoga Park, CA (US); Mark Andrew Fitzsimmons, Canoga Park, CA (US); Chad Schepel, Canoga Park, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 128 days.

(21) Appl. No.: 13/022,097

(22) Filed: Feb. 7, 2011

(65) Prior Publication Data

US 2012/0201980 A1 Aug. 9, 2012

(51) Int. Cl.

*B28B 1/30* (2006.01)
*B28B 7/32* (2006.01)
*B28B 23/00* (2006.01)

(52) U.S. Cl.

USPC ........... 264/313; 264/219; 264/257; 264/314; 264/317; 264/333; 428/34.5

(58) Field of Classification Search ........................ None
See application file for complete search history.

(56) References Cited

U.S. PATENT DOCUMENTS 5,648,109 A * 7/1997 Gutowski et al. ............. 425/504
2007/0145642 A1* 6/2007 Korwin-Edson et al. ..... 264/313
2008/0099956 A1* 5/2008 Walden ......................... 264/313
2010/0003402 A1* 1/2010 Stout et al. .................... 427/226

FOREIGN PATENT DOCUMENTS

EP 2484653 A2 * 8/2012
JP 195562 8/1995
JP 2001294488 10/2001

OTHER PUBLICATIONS

Partial European Search Report dated Apr. 27, 2012.

* cited by examiner

*Primary Examiner* — Christina Johnson
*Assistant Examiner* — Benjamin Schiffman
(74) *Attorney, Agent, or Firm* — Carlson, Gaskey & Olds

(57) ABSTRACT

A method for use in manufacturing a ceramic matrix composite article includes assembling a ceramic fiber sheet between a tool and a die, where the tool is conformable to the shape of the die and the melting point of the die is greater than the melting point of the tool. The assembly is then heated to soften the tool. At least one of the tool, the die or a separate inflatable member is then pressurized to conform the tool and the ceramic fiber sheet to the die. Next, the assembly is cooled and the pressure is vented before removal of the tool and ceramic fiber sheet from the die. A preceramic resin with a catalyst is then applied to the ceramic fiber sheet and cured at a curing temperature that is below the melting point of the tool, to form a preform. The tool is then removed from the preform.

18 Claims, 4 Drawing Sheets

24

20

22

26

METHOD FOR MANUFACTURING A CERAMIC COMPOSITE ARTICLE

BACKGROUND

This disclosure relates to a method for use in the manufacturing of a fiber-reinforced article having a complex geometry.

Fiber-reinforced composite articles, such as ceramic matrix composites, are often limited to geometries that can be formed using the manufacturing techniques of the fiber-reinforced composite material. A typical manufacturing technique involves stacking plies or sheets of a woven fiber structure, impregnating the fibers with a resin material and curing the resin material. Alternatively, the fibers can be formed into a desired shape, such as a woven straight tube. However, forming the fibers into more complex geometries, such as curved tubes, is costly and may damage the fibers to the detriment of the final article.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

FIGS. 1A-1D schematically illustrate an example method for use in the manufacturing of a fiber-reinforced article. The method is applicable to a variety of different fiber-reinforced composite materials, such as polymer or ceramic matrix composites that use high strength fibers (e.g., carbon or ceramic). As will also be described, the method may be used in the fabrication of articles having relatively complex geometries, which prior methods are incapable of forming or are too costly to be practical.

In one embodiment, the method includes softening a tool to a pliable state and moving the softened tool against an opposed contoured die surface, with a fiber structure between the tool and the contoured die surface. The movement of the softened tool against the contoured die surface conforms the softened tool and the fiber structure to the contoured die surface. The tool is then hardened to a rigid state such that the tool and the fiber structure maintain the contour of the contoured die surface.

Figure 1A:
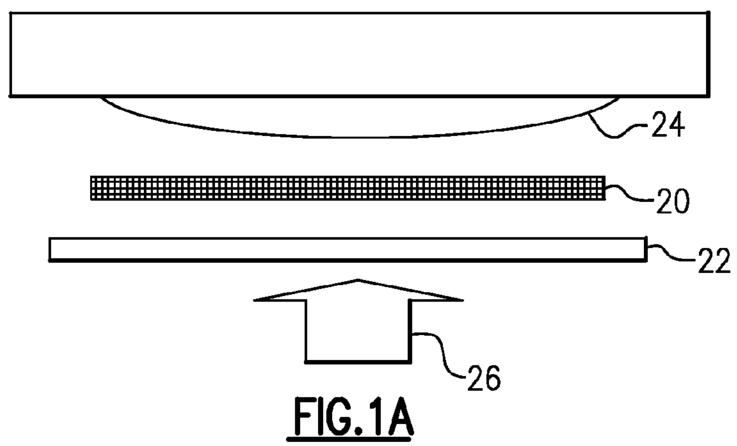
FIGS. 1A-D illustrate example steps of a method for use in manufacturing a fiber-reinforced article.
Figure 1B:
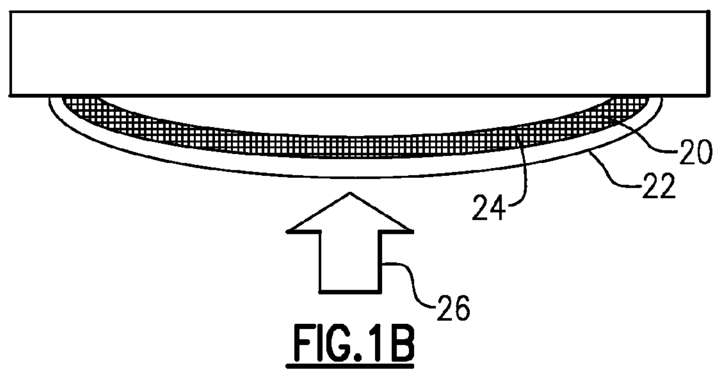

Referring to an example in FIG. 1A, a fiber structure 20 is located between a tool 22 and an opposed contoured die surface 24. The tool 22 is then softened to a pliable state and moved against the contoured die surface 24, as generally represented by arrow 26 and as shown in FIG. 1B.

Figure 1C:
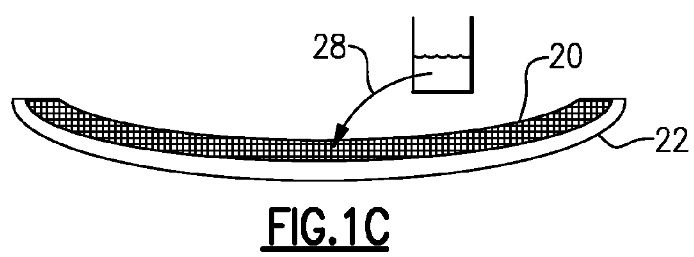

The fiber structure 20 and the softened tool 22 conform to the contoured die surface 24 such that, upon hardening of the tool 22 to a rigid state, the tool 22 and the fiber structure 20 are self-supporting and maintain the contour of the contoured die surface 24, as shown in FIG. 1C.

The ability to soften and subsequently harden is achieved through material selection of the tool 22, for example. The tool 22 may be formed of a material that can be softened to a pliable state and then subsequently hardened to a rigid state. In embodiments, the tool 22 is formed of a thermoplastic material, such as a polyolefin. One type of polyolefin is polypropylene, but this disclosure also contemplates the use of other polyolefins such as polyethylene. The thermoplastic material softens upon heating the tool 22 to a temperature close to the melting temperature ($T_m$) of the material, and hardens upon cooling to a temperature well below $T_m$. In embodiments, the softening temperature is within 30° C. of $T_m$, and the hardening temperature is lower than $T_m$ −30° C. Alternatively, the tool 22 can be a thermosetting polymer. In another alternative, the tool 22 may be made of a low-melting point metallic material, such as tin or a tin alloy, which softens at a temperature within about 30° C. of its $T_m$. In any case, the melting point of the tool 22 is below the melting point of the die 24. As will be described in more detail below, the tool 22 is sacrificial or temporary and is later removed through chemical or thermal techniques.

Figure 1D:
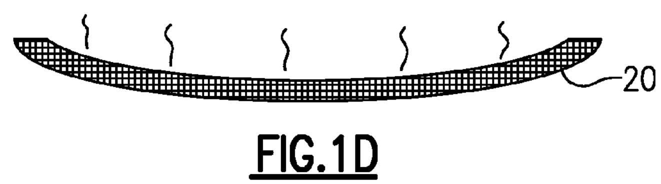

The tool 22 and fiber structure 20 are then removed from the die cavity for infiltration of a resin material 28 into the fibers to form a matrix. The infiltration may include spraying the resin material 28 onto the fiber structure 20, dipping the tool 22 and fiber structure 20 into the resin material 28, or resin transfer molding the resin material 28. After infiltration, the resin material 28 is cured under appropriate conditions, as generally shown in FIG. 1D.

The curing conditions may depend on the type of resin material 28 that is used. Polymeric resins may cure at relatively low or ambient temperatures. Alternatively, the tool 22 and infiltrated fiber structure 20 may be subjected to a heat treatment to cure the resin. The resin and the material of the tool 22 are selected such that the curing temperature of the resin is lower than the softening temperature or melting point of the material of the tool 22. The tool 22 and fiber structure 20 thereby maintain the contoured shape during the curing process.

For polymeric resins, such as epoxy resins, the curing temperature is relatively low and is below the softening temperature and melting point (e.g., of polypropylene) of the tool 22. However, other resins, such as preceramic resins, may have higher curing temperatures that are close to or exceed the softening temperature. In such as case, the resin may include a catalyst that serves to lower the curing temperature below the softening temperature of the material of the tool 22. For instance, in a preceramic resin that is a silicon carbide precursor, a zirconia or platinum catalyst is used to reduce the curing temperature to approximately 220° F. (approximately 104° C.) or lower, which is below the $T_m$ of the polypropylene material of the tool 22. One example resin that may be used is known under the designation of SMP-10 (Starfire® Systems, Inc.).

After curing the resin, the tool 22 is removed from the fiber structure 20. As an example, the tool 22 may be thermally removed at an elevated temperature. Alternatively, the tool 22 may be chemically removed, such as by using an etching process.

After removal of the tool 22, the fiber structure 20 may be subjected to a further heat treatment to convert the preceramic resin to a ceramic matrix, in the case of a preceramic resin. Alternatively, if the resin is polymeric, no further heat treatment may be necessary.

Figure 2A:
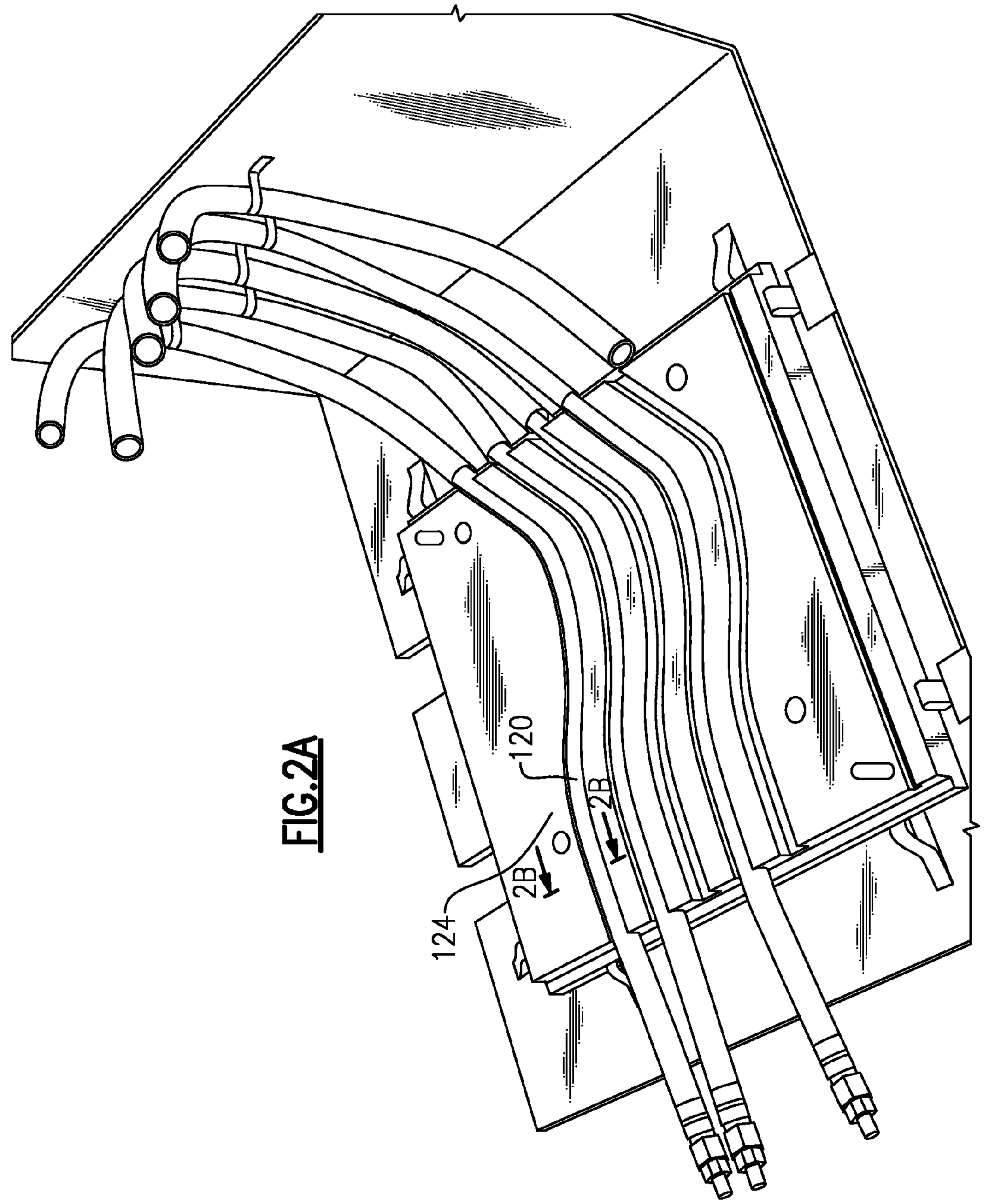
FIGS. 2A-2F illustrate example steps of a method for use in manufacturing another fiber-reinforced article.
Figure 2B:
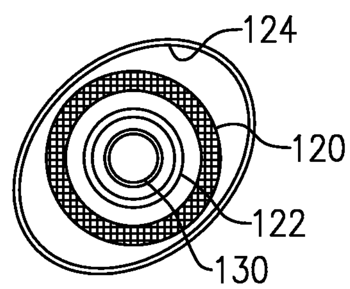

FIGS. 2A-2F illustrate another example of the method, which is used to form a tubular structure. In this example, a tubular fiber structure 120 is assembled into a die cavity that defines a contoured die surface 124. The assembly is shown in FIGS. 2A and 2B. The tubular fiber structure 120 may be formed from a sheet or cloth of ceramic fibers. A corresponding tubular tool 122 is inserted within the tubular fiber structure 120 and then heated to the softening temperature. Optionally, an inflatable member 130 is inserted within the tubular tool 122. For instance, the inflatable member 130 may be an inflatable bag, such as a high temperature nylon bag. As described with reference to FIGS. 1A-D, the melting point of the die 124 is greater than the melting point of the tool 122.

The following steps are a further example of the assembly process:

Verify that all of the polypropylene tubes are the proper length (e.g. that they have been trimmed to be shorter than the die).

Pull a narrow nylon pressure bag through each poly tube so that the open end faces the front side of the clam-shell die.

Create a tapered termination on the closed end of the nylon bags between 1.5"-2" long:

a. Pull 1.5"-2" of bag from the back end of the tube.

b. Create a double length of heavy gauge wire; the doubled length is longer than the carbon fiber tube pre-form.

c. Twist the double wire onto the closed end of the bag.

d. Use high temperature tape to compact the end, making a taper; make the wrapping tight.

Mark the open end of the bag at 2.25" and 3.75" from the end of the polypropylene tube.

Cut the bag at the 3.75" mark.

Slide a metal sheath onto the bag/polypropylene assembly, fiber-tape end first.

Wrap a thin layer of gray sealant putty around the barbed fitting.

Insert the barb with sealant into the bag and wedge against the non-sealed side.

Wrap the bag tightly around the barbed fitting.

Tape the bag/pucky to the barb with a padded high temp tape; wrap the fitting twice.

Place a 0.030" wire at the forward end of the barb and wire-tie it tightly; do not place the wire directly over the sealant putty.

Place a 0.020" wire at the aft end of the barb and wire-tie it tightly; do not place the wire directly over the sealant putty.

Begin sliding the carbon tubes on, starting by feeding the double wire through, taking care not to grasp the polypropylene tube after wire tying to avoid slippage.

Use a metal insertion tool to complete the sliding of the carbon tubes.

Load into the blow-molding tool and ensure that the polypropylene is not sticking out of the die.

Referring to FIG. 2B, at least one of the tubular tool 122, die 124 or the inflatable member 130 is pressurized to expand the tubular fiber structure 120 and tubular tool 122 against the contoured die surface 124. The tubular tool 122 may be pressurized by inflating the inflatable member 130. Alternatively, the tubular tool 122 may be directly pressurized without the use of the bag or dedicated inflatable member 130.

Figure 2C:
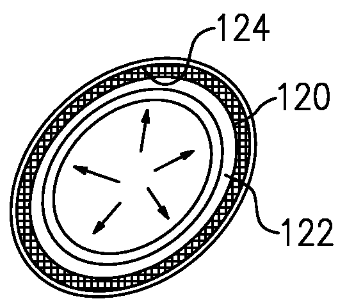

Referring to FIG. 2C, after pressurization, the tubular tool 122 is cooled to harden the tubular tool 122 to a rigid state and the pressure is vented. The rigid tubular tool 122 thereby maintains the tubular fiber structure 120 in the shape of the contoured die surface 124.

Figure 2D:
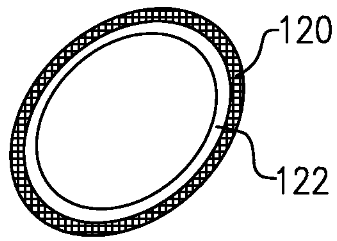

Referring to FIG. 2D, the tubular fiber structure 120 is then infiltrated with a resin material 128 in a similar manner as described above with regard to FIG. 1C. The tubular fiber structure 120 is impregnated with the resin material 128 while held in the contoured shape by the tubular tool 122.

Figure 2E:
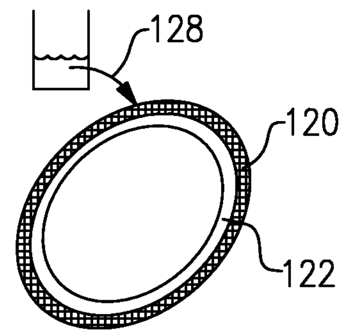
Figure 2F:
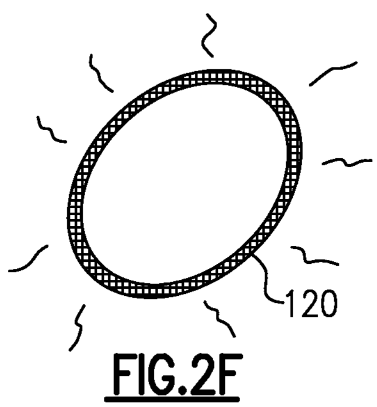

Referring to FIG. 2E, the resin material is then cured, as described above, and the tubular tool 122 removed. If a preceramic resin is used, the tubular fiber structure 120 may be further heat treated to convert the resin to the ceramic matrix.

In a further example, a ceramic fiber sheet or structure was assembled between a tool and a die. The tool was conformable to the shape of the die and the melting point of the die was greater than the melting point of the tool. The assembly was then heated to soften the tool. Next, the tool was pressurized to conform the tool and the ceramic fiber sheet to the die. The assembly was then cooled and vented before the removal of the tool and ceramic fiber sheet from the die. A preceramic polymer resin with a catalyst was then applied to the ceramic fiber sheet and cured at a curing temperature that was below the melting point of the tool, to form a preform. The tool was then removed from the preform. The preform was then heated at a pyrolysis temperature to convert the preceramic polymer to a ceramic matrix around the fibers of the ceramic fiber sheet.

Figure 3:
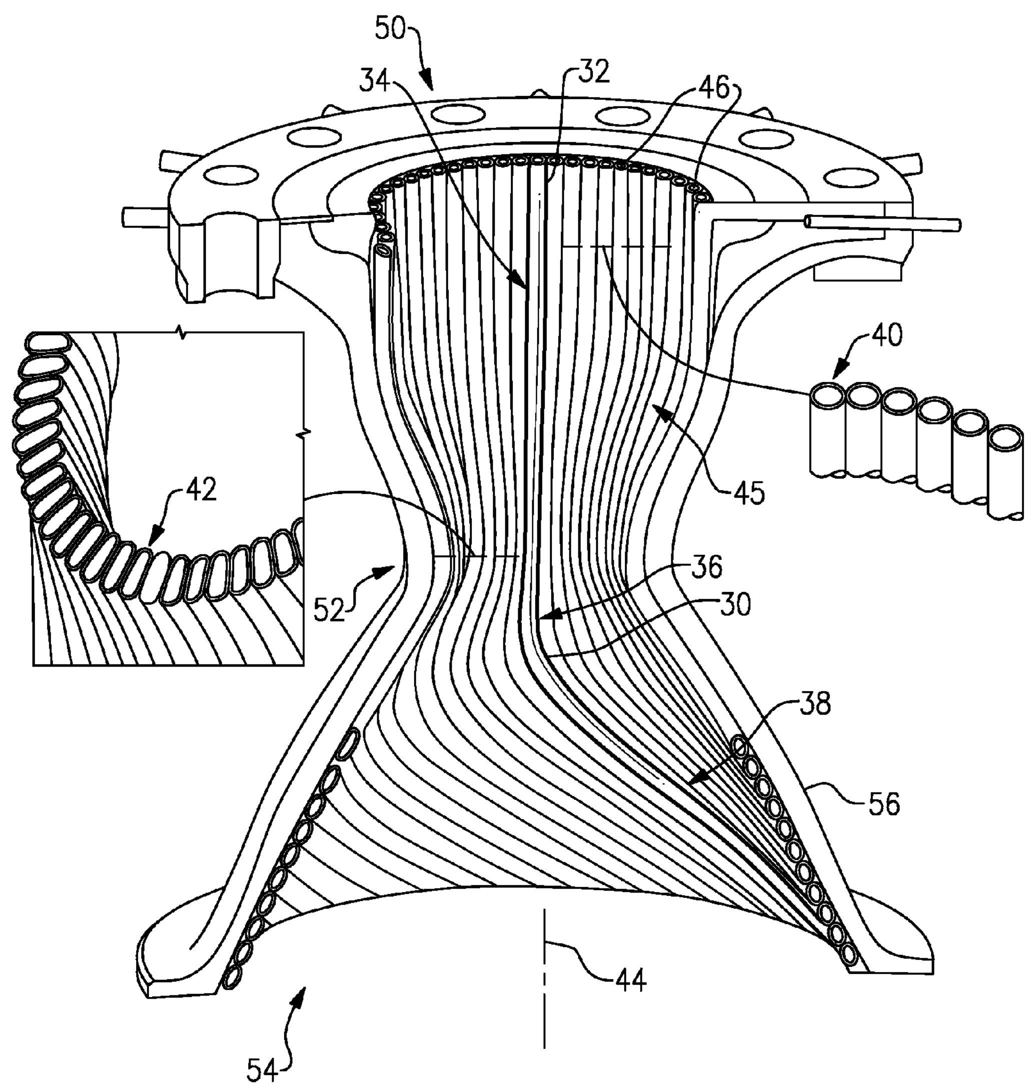
FIG. 3 illustrates an example fiber-reinforced article that may be manufactured using a method disclosed herein.

FIG. 3 schematically depicts a fiber-reinforced article 30 that was manufactured as described above. The fiber-reinforced article 30 is a tubular structure that includes walls 32 that are formed of the fiber-reinforced composite material described above. For instance, the fiber-reinforced material may be a polymer or ceramic matrix composite that includes carbon or ceramic fibers. In embodiments, the ceramic fibers are silicon carbide fibers, and the matrix is epoxy, silicon carbide, or carbon.

The tubular structure defines a first section 34 that transitions into a second section 36. The second section 36 may further transition into a third section 38. The first section 34 is of the tubular structure is substantially straight and the second section 36 curves As shown in the sectioned sub-figures, the walls 32 of the first section 34 form a circular cross-section 40, and the walls 32 in the second section 36 form a non-circular cross-section 42. The non-circular cross-section 42 allows the tubular structure to transition from the substantially linear geometry to the curved geometry. In addition to the curvature, the third section 38 curves helically about an axis 44.

As shown, a plurality of the fiber-reinforced articles 30 may be arranged side-by-side (e.g., by attachment) around the axis 44 to form the depicted article and chamber 45. In this example, the article is a combustion chamber of an aerospace vehicle, such as a rocket. Optionally, each of the fiber-reinforced articles 30 may include a fitting 46 at one end for connecting to a manifold or other source of coolant.

The fiber-reinforced articles 30 of the chamber 45 form an inlet 50 that narrows to a throat 52 that then widens to an outlet 54. A jacket 56 may be provided around the fiber-reinforced articles 30 to provide further support and attach the chamber 45 to other components of the vehicle. In operation, the coolant runs through the tubes formed by the fiber-reinforced articles 30 to cool the chamber 45.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for use in manufacturing a ceramic matrix composite article, the method comprising:

assembling a ceramic fiber sheet between a tool and a die, where the tool is conformable to the shape of the die and the melting point of the die is greater than the melting point of the tool;

heating the assembly of the tool, the ceramic fiber sheet and the die to soften the tool;

pressurizing at least one of the tool, the die or a separate inflatable member to conform the tool and the ceramic fiber sheet to the die;

cooling the assembly of the tool, the ceramic fiber sheet and the die such that the tool hardens;

venting the pressure;

removing the tool and ceramic fiber sheet from the die;

applying a preceramic resin with a catalyst to the ceramic fiber sheet;

curing the preceramic resin with catalyst at a curing temperature that is below the melting point of the tool, to form a preform; and removing the tool from the preform.

2. The method as recited in claim 1, further comprising converting the preceramic resin to a ceramic matrix.

3. The method as recited in claim 1, wherein the tool is formed of a thermoset polymer material.

4. The method as recited in claim 1, wherein the tool is formed of a material that includes tin.

5. The method as recited in claim 1, wherein the tool is formed of a thermoplastic material.

6. The method as recited in claim 1, wherein the tool is formed of a polyolefin.

7. The method as recited in claim 1, wherein the removing of the tool is by melting the tool.

8. The method as recited in claim 1, wherein the removing of the tool is by chemical etching of the tool.

9. A method for use in manufacturing a ceramic matrix composite article, the method comprising:

softening a die member to a pliable state;

moving the softened die member against an opposed contoured die surface, with a fiber structure between the die member and the contoured die surface, to conform the die member and the fiber structure to the contoured die surface; and hardening the die member to a rigid state such that the die member and the fiber structure maintain the contour of the contoured die surface.

10. The method as recited in claim 9, wherein the softening of the die member includes heating the die member and the hardening of the die member includes cooling the die member.

11. The method as recited in claim 9, wherein the moving of the softened die member against the opposed contoured die surface includes inflating an inflatable member against the softened die member.

12. The method as recited in claim 11, wherein the fiber structure is a tubular fiber structure and the inflatable member is located within the tubular structure.

13. The method as recited in claim 9, further comprising impregnating the fiber structure, while the fiber structure is maintained in the contour of the contoured die surface, with a resin material, and curing the resin material.

14. The method as recited in claim 13, wherein the curing includes heating the die member, the fiber structure and the resin material to a curing temperature.

15. The method as recited in claim 14, wherein the curing temperature is lower than the softening temperature of the die member.

16. The method as recited in claim 14, wherein the resin material is a preceramic resin.

17. The method as recited in claim 16, further comprising converting the preceramic resin to a ceramic matrix.

18. The method as recited in claim 13, further comprising removing the die member from the fiber structure after the curing.

* * * * *